(12) United States Patent
Dean et al.

(10) Patent No.: US 11,461,686 B2
(45) Date of Patent: Oct. 4, 2022

(54) DISAGGREGATION OF APPLIANCE USAGE FROM ELECTRICAL METER DATA

(71) Applicant: GRID4C LTD., Tel Aviv (IL)

(72) Inventors: Nitai Dean, New York, NY (US); Ilya Brodin, Rishon LeZion (IL); Yoav Talmi, Tel Aviv (IL)

(73) Assignee: GRID4C LTD., Tel Aviv (IL)

(*) Notice: Subject to any disclaimer, the term of this patent is extended or adjusted under 35 U.S.C. 154(b) by 825 days.

(21) Appl. No.: 16/083,072

(22) PCT Filed: Mar. 8, 2017

(86) PCT No.: PCT/IL2017/050296
§ 371 (c)(1),
(2) Date: Sep. 7, 2018

(87) PCT Pub. No.: WO2017/153997
PCT Pub. Date: Sep. 14, 2017

(65) Prior Publication Data
US 2019/0034817 A1    Jan. 31, 2019

Related U.S. Application Data

(60) Provisional application No. 62/305,022, filed on Mar. 8, 2016.

(51) Int. Cl.
*G06F 17/10*    (2006.01)
*G06N 7/00*    (2006.01)
(Continued)

(52) U.S. Cl.
CPC .............. *G06N 7/005* (2013.01); *G06F 16/24* (2019.01); *G06F 17/15* (2013.01); *G06N 20/00* (2019.01);
(Continued)

(58) Field of Classification Search
CPC ........ G06N 7/005; G06F 17/15; G06Q 50/06; H04L 67/303
See application file for complete search history.

(56) References Cited

U.S. PATENT DOCUMENTS

2003/0130899 A1    7/2003 Ferguson
2013/0103215 A1    4/2013 Dai et al.
(Continued)

FOREIGN PATENT DOCUMENTS

CN    104092775 A    10/2014

OTHER PUBLICATIONS

Basu Classification Techniques for Non-Intrusive Load Monitoring and Prediction of Residential Loads Thesis, University of Grenoble, Nov. 2014 (Year: 2014).*
(Continued)

*Primary Examiner* — Rehana Perveen
*Assistant Examiner* — Cuong V Luu
(74) *Attorney, Agent, or Firm* — Browdy and Neimark, P.L.L.C.

(57) ABSTRACT

The present invention provides a method for determining consumption of appliances within a surveyed household in which there are no sensors for measuring consumption of specific appliances. The method comprises—pre-processing historical consumption of appliances in a group of sampled household, based on measurements performed by sensors associated with said appliances, in relation to profiles of households, including characteristics of each household and/or lifestyle of the occupants and environmental time dependent parameters, —detecting presence of an appliance in a surveyed household based on correlations between the household profile and consumption patterns based on sampled measurement taken at predefined discrete time periods such 1 minutes, —detecting periodic activation in (Continued)

the surveyed household based on detection of presence of each appliance, identified correlations to household profile and consumption pattern and—estimating consumption of each appliance is the surveyed households based on detection of periodic activation of each appliance, identified correlations to households profile and consumption pattern.

11 Claims, 9 Drawing Sheets

(51) Int. Cl.
| | | |
|---|---|---|
| H04L 67/303 | (2022.01) | |
| G06Q 50/06 | (2012.01) | |
| H04L 67/12 | (2022.01) | |
| H04L 12/28 | (2006.01) | |
| H04L 65/40 | (2022.01) | |
| G06N 20/00 | (2019.01) | |
| G06F 16/24 | (2019.01) | |
| G06F 17/15 | (2006.01) | |

(52) U.S. Cl.
CPC ......... *G06Q 50/06* (2013.01); *H04L 12/2809* (2013.01); *H04L 65/40* (2013.01); *H04L 67/12* (2013.01); *H04L 67/303* (2013.01)

(56) References Cited

U.S. PATENT DOCUMENTS

| | | |
|---|---|---|
| 2013/0110621 A1 | 5/2013 | Gupta et al. |
| 2013/0289788 A1* | 10/2013 | Gupta ............... G05B 15/02 700/291 |

OTHER PUBLICATIONS

Mayhorn et al. Characteristics and Performance of Existing Load Disaggregation Technologies Pacific Northwest National Laboratory, Apr. 2015 (Year: 2015).*

Chao et al. A Profile Based Energy Management System for Domestic Electrical Appliances IEEE International Conference on E-Business Engineering (Year: 2010).*

* cited by examiner

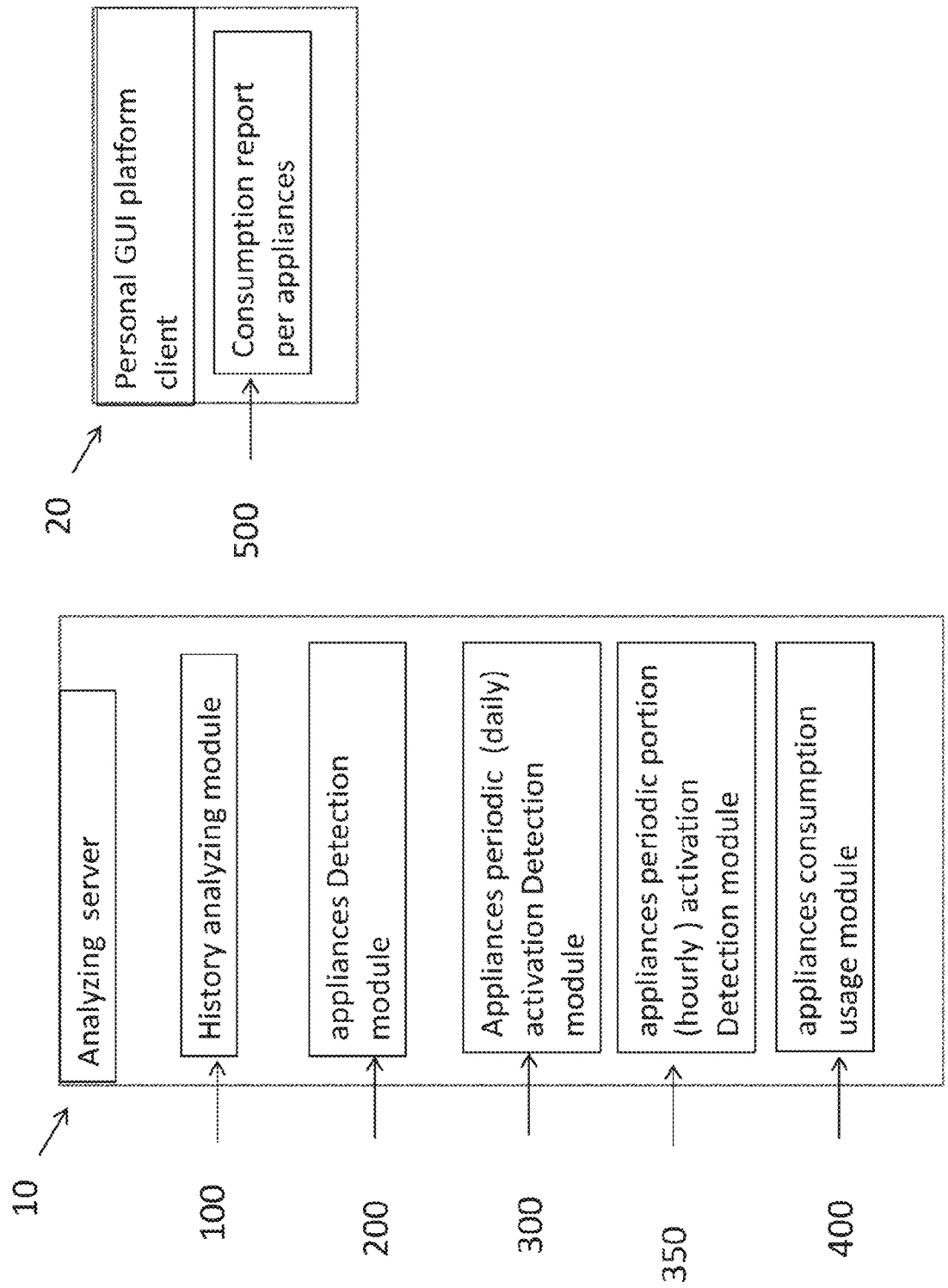

100 — History analyzing module

110 — Pre-processing per meter of households of historical consumption usage of appliances based actual measurement performed by sensors associated with said appliances in relation to profile of household including characteristics of the house and/or life span of the occupant and environmental time depended parameters

120 — Apply learning algorithm for identifying statistical correlations between presence of appliances at each house hold and at least one of : 1) house hold profiles parameters, 2) house hold actual periodic consumption usage pattern 3) house hold actual periodic consumption usage pattern in relation to environmental time depended parameters

130 — Building a households appliance presence model which defines the relation between the presences of each appliance and the household profile consumption usage based on identified statistical correlation of both house hold profile and global consumption usage parameters

140 — Apply learning algorithm for identifying statistical correlations between 1) house hold actual periodic consumption usage pattern and the actual activation per day of each appliance in relation to environmental time depended parameters or life span of the occupant 2) house hold profile and the actual consumption rate of each appliance 3) data on appliance activation in former days

150 — Building a house hold- appliance periodic day activation model which defines the relation between the activation of appliance per day based on identified statistical correlation of both house hold profile global consumption usage parameters, usage of other appliances data on appliance activation in former days

155 — Apply learning algorithm for identifying statistical correlations between 1) house hold actual periodic portion (hourly) consumption usage pattern and the actual activation per periodic portion of each appliance in relation to environmental time depended parameters or life span of the occupant 2) house hold profile and the actual consumption rate of each appliance 3) data on appliance activation in former days

157 — Building a house hold- appliance periodic portion (hourly )activation model which defines the relation between the activation of appliance per day and the house hold profile consumption usage based on identified statistical correlation of both house hold profile global consumption usage parameters, usage of other appliances data on appliance activation in former days

160 — Apply learning algorithm for identifying statistical correlations between actual consumption rate of each appliance and 1) house hold actual periodic consumption usage pattern of each appliance in relation to environmental time depended parameters or life span of the occupant 2) house hold profile and the global consumption rate of each appliance 3) consumption usage of other appliances

170 — Building a house hold- appliance usage model which defines the relation between the consumption of each appliance and the house hold global consumption usage based on identified statistical correlation of both house hold profile and consumption usage parameters

Fig.2

200 Detection of presence appliances module

210 Apply learning algorithm for analyzing actual global consumption per house hold meter based on sampled measurement taken at predefined time periods such 15 minutes in relation to profile of the household having no sensor for measuring specific appliance and time depended environmental parameters of the relevant time period and in relation to life span of the occupant

220 determining the probability of each appliance presence at the analyzed house hold based on a house hold- appliance presence model using the identified profile parameters and actual behavior pattern of the analyzed household

230 Ongoing validating and improving calculation of appliance presence in pre-defined time period based on users feedback

Fig. 3

300 appliances (daily) activation Detection module

310 Apply learning algorithm for analyzing actual global consumption per house hold meter based on sampled measurement taken at discrete predefined time periods such 15 minutes in relation to profile of the house hold having no sensor for measuring specific appliance and time depended environmental parameters of the relevant time period and in relation to life span of the occupant

320 determining for each identified appliance the if an appliance was activated during the current day at the analyzed house hold based on a house hold- appliance daily activation model using the identified profile parameters, actual behavior pattern of the analyzed household in relation to actual time depended environmental parameters of the relevant time period and activation of the appliance during last days

Fig.4A

350 appliances (hourly) activation Detection module

360 Apply learning algorithm for analyzing actual global consumption per house hold meter based on sampled measurement taken at discrete predefined time periods such as 15 minutes in relation to profile of the house hold having no sensor for measuring specific appliance and time depended environmental parameters of the relevant time period and in relation to life span of the occupant

370 determining for each identified appliance the if an appliance was activated during the specific hour of the day at the analyzed house hold based on a house hold- appliance daily activation model using the identified profile parameters, actual behavior pattern of the analyzed household in relation to actual time depended environmental parameters of the relevant time period and activation of the appliance during last days or hours

Fig.4B

DISAGGREGATION OF APPLIANCE USAGE FROM ELECTRICAL METER DATA

TECHNICAL FIELD

The present invention relates to the field of estimating electrical appliance consumption, and more particularly, estimating the presence and consumption of electrical appliance based on household profile and consumption behavior pattern.

BACKGROUND ART

To track electrical consumption of individual household appliances, prior art solutions require direct measurement of each appliance using electricity consumption ("load") sensors associated with each appliance, or alternatively, continuous smart meter measurements. The first solution requires installation of additional hardware, i.e., sensors for each appliance. The second solution requires more expensive processing resources.

The present invention provides a solution without appliance sensors and by means of common household meters providing periodic discrete consumption measurements.

SUMMARY OF INVENTION

The present invention provides a method for determining the presence of an appliance within a surveyed household, based on periodic surveying of the household's electric meter.

The method comprising the steps of:
pre-processing groups of households of historical consumption of appliances based actual measurement performed by sensors associated with said appliances in relation to profile of household including characteristics of the household and/or lifestyle of the occupant and environmental time dependent parameters, and
determining the probability of each appliance presence at the surveyed household based on identified profile parameters and actual behavior pattern of the analyzed household based on sampled measurement taken at predefined discrete time periods such 15 minutes in relation to actual time dependent environmental parameters of the relevant time period, by processing identified statistical correlations between presence of appliances at each household and 1) household profiles parameters, 2) household actual periodic consumption pattern 3) household actual periodic consumption pattern in relation to environmental time dependent parameters.

The present invention provides a method for determining consumption of appliances within a surveyed household in which there are no sensors for measuring consumption of specific appliance.

The method comprising the steps of:
pre-processing per meter of households per meter of historical consumption of appliances based actual measurement performed by sensors associated with said appliances in relation to profile of household including characteristics of the household and/or lifestyle of the occupant and environmental time dependent parameters,
detecting presence is surveyed household based on identified correlations to household profile and consumption pattern based on sampled measurement taken at predefined discrete time periods such 15 minutes,
detecting periodic activation in the surveyed household based on detection of presence of each appliance, identified correlations to household profile and consumption pattern and
estimating consumption of each appliance is the surveyed households based on detection of periodic activation of each appliance, identified correlations to a household's profile and consumption pattern;

The present invention provides a method for determining presence of an appliance within a surveyed household, in which there are no sensors for measuring consumption of the specific appliance.

The method comprising the steps:
pre-processing groups of households of historical consumption per meter of appliances based actual measurement performed by sensors associated with said appliances in relation to profile of household including characteristics of the households and/or lifestyle of the occupant and environmental time dependent parameters;
Identifying statistical correlations between presence of appliances at each household and 1) household profiles parameters, 2) household actual periodic consumption pattern 3) household actual periodic consumption pattern in relation to environmental time dependent parameters;
Building a household appliance presence model which defines the relation between the presences of each appliance and the household profile consumption based on identified statistical correlation of both household profile and global consumption parameters based on sampled measurement taken at predefined time periods such 15 minutes;
analyzing actual global consumption of a single analyzed household meter having no sensors for measuring consumption per appliance in relation to profile of the analyzed household and time dependent environmental parameters of the relevant time period and in relation to lifestyle of the occupant; and
determining a probability of presence for each appliance at the analyzed household based on a household-appliance presence model using the identified profile parameters and actual behavior pattern of the analyzed household in relation to actual time dependent environmental parameters of the relevant time period.

The present invention provides a method for determining presence appliance within a surveyed household in which there are no sensors for measuring consumption of specific appliance, said method implemented by one or more processing devices operatively coupled to a non-transitory storage device, on which are stored modules of instruction code that when executed cause the one or more processing devices to perform:
pre-processing per meter of sampled households of historical consumption of appliances based actual measurement performed by sensors associated with said appliances in relation to profile of household including characteristics of the household or lifestyle of the occupant and environmental time dependent parameters;
apply learning algorithm for Identifying statistical correlations between presence of appliances at each household and at least on of: 1) household profiles parameters, 2) household actual periodic consumption pattern 3) household actual periodic consumption pattern in relation to environmental time dependent parameters
building household appliance presence model which defines the relation between the presences of each appliance and the household profile consumption based on Identifying statistical correlations;

determining the probability of each appliance presence at the surveyed household using identified profile parameters and the calculated consumption of the actual behavior pattern of the surveyed household, based on processing identified statistical correlations between presence of appliances at each household and 1) household profiles parameters, 2) household actual periodic consumption pattern 3) household actual periodic consumption pattern in relation to environmental time dependent parameters.

According to some embodiments of the present invention, the method further comprising the steps:

Apply learning algorithm for Identifying statistical correlations between 1) household actual periodic consumption pattern and the actual activation per day of each appliance in relation to at least one of: environmental time dependent parameters or lifestyle of the occupant 2) household profile and the actual consumption rate of each appliance 3) data on appliance activation in former days;

Building a household appliance period activation model based on identified statistical correlations which defines the relation between the periodically activation of each appliance and the household profile consumption Applying the household appliance period activation model for determining for each identified appliance if an appliance was activated during the current period at the surveyed household by processing identified statistical correlations between appliance activation and at least one of: profile parameters, actual behavior pattern of the analyzed household in relation to actual time dependent environmental parameters of the relevant time period.

According to some embodiments of the present invention, the method further comprising the steps:

applying a learning algorithm for identifying statistical correlations between household actual periodic portion (hourly) consumption pattern and the actual activation per periodic portion of each appliance in relation to at least on of environmental time dependent parameters or lifestyle of the occupant 2) household profile and the actual consumption rate of each appliance 3) data on appliance activation in former days or hours;

building a household appliance periodic portion activation model based on identified statistical correlations, which defines the statistical correlations between the hourly activation of each appliance and the household profile consumption applying the household appliance hourly activation model for determining for each identified appliance at what hours the detected appliance was activated during detected activated period at the surveyed household by processing identified statistical correlations between appliance activation and at least one of: profile parameters, actual behavior pattern of the analyzed household in relation to actual time dependent environmental parameters of the relevant time period.

According to some embodiments of the present invention, the method further comprising the steps:

Building a household appliance usage consumption model which defines the relation between the consumption of each appliance and the household global consumption based on identified statistical correlation of both household profile and consumption parameters;

Applying household appliance usage consumption model for estimating consumption of each activated appliance in the surveyed household based on identified correlations to between household profile and consumption pattern of the household;

According to some embodiments of the present invention, the method further comprising the step of re-estimating a detected daily activated list of all appliances in the house using the model based on consumption per period.

According to some embodiments of the present invention, the method further comprising: Identifying statistical correlations between 1) household actual periodic consumption pattern and the actual activation per day of each appliance in relation to environmental time dependent parameters or lifestyle of the occupant 2) household actual periodic consumption pattern and actual activation per day each appliance 3) household profile and the actual consumption rate of each appliance 4) data on appliance activation in former days The present invention also provides a computer based system for determining presence appliance within a household in which there are no sensors for measuring consumption of specific appliance, said system comprising a non-transitory storage device and one or more processing devices operatively coupled to the storage device on which are stored modules of instruction code executable by the one or more processors:

History analyzing module for pre-processing per meter of sample households of historical consumption of appliances based actual measurement performed by sensors associated with said appliances in relation to profile of household including characteristics of the household and/or lifestyle of the occupant and environmental time dependent parameters;

appliances Detection module for apply learning algorithm for Identifying statistical correlations between presence of appliances at each household and at least on of: 1) household profiles parameters, 2) household actual periodic consumption pattern 3) household actual periodic consumption pattern in relation to environmental time dependent parameters building household appliance presence model which defines the relation between the presences of each appliance and the household profile consumption based on Identifying statistical correlations; and determining the probability of each appliance presence at the surveyed household using identified profile parameters and the calculated consumption of the actual behavior pattern of the surveyed household, based on processing identified statistical correlations between presence of appliances at each household and 1) household profiles parameters, household actual periodic consumption pattern in relation to environmental time dependent parameters.

The present invention provides a method for determining periodic appliances activation within a surveyed household in which there are no sensors for measuring activation of specific appliance, said method comprising the steps of:

pre-processing per meter of households of historical consumption of appliances based actual measurement performed by sensors associated with said appliances in relation to profile of household including characteristics of the household and/or lifestyle of the occupant and environmental time dependent parameters;

determining for each appliance the if an appliance was activated during the current period at the surveyed household based on a household appliance periodic activation model using the identified profile parameters, actual behavior pattern of the analyzed household in relation to actual time dependent environmental parameters of the relevant time period and activation of the appliance during last days.

The present invention provides a method for determining consumption of appliances within a surveyed household in which there are no sensors for measuring consumption of specific appliance, said method comprising the steps of:

pre-processing per meter of households of historical consumption of appliances based actual measurement performed by sensors associated with said appliances in relation to profile of household including characteristics of the household and/or lifestyle of the occupant and environmental time dependent parameters;

detecting presence is surveyed household based on identified correlations to household profile and consumption pattern based on sampled measurement taken at predefined discrete time periods such 15 minutes;

detecting periodic activation in the surveyed household based on detection of presence of each appliance, identified correlations to household profile and consumption pattern;

estimating consumption of each appliance is the surveyed household based on detection of periodic activation of each appliance, identified correlations to household profile and consumption pattern;

The present invention provides a method for determining presence appliance within a household in which there are no sensors for measuring consumption of specific appliance, said method comprising the steps:

pre-processing per meter of households of historical consumption of appliances based actual measurement performed by sensors associated with said appliances in relation to profile of household including characteristics of the household and/or lifestyle of the occupant and environmental time dependent parameters;

Identifying statistical correlations between presence of appliances at each household and 1) household profiles parameters, 2) household actual periodic consumption pattern 3) household actual periodic consumption pattern in relation to environmental time dependent parameters Building a household appliance presence model which defines the relation between the presences of each appliance and the household profile consumption based on identified statistical correlation of both household profile and global consumption parameters based on sampled measurement taken at predefined time periods such 15 minutes analyzing actual global consumption of a single analyzed household meter in relation to profile of the analyzed household and time dependent environmental parameters of the relevant time period and in relation to lifestyle of the occupant;

determining the probability of each appliance presence at the analyzed household based on a household appliance presence model using the identified profile parameters and actual behavior pattern of the analyzed household in relation to actual time dependent environmental parameters of the relevant time period.

These, additional, and/or other aspects and/or advantages of the present invention are: set forth in the detailed description which follows; possibly inferable from the detailed description; and/or learnable by practice of the present invention.

BRIEF DESCRIPTION OF DRAWINGS

FIG. 1 is a block diagram illustrating the modules for analyzing samples of appliances consumption history and estimating appliances of consumption in tested households according to some embodiments of the present invention.

FIG. 2 is an illustration flow chart of the History Analyzing Module (100) according to some embodiments of the preset invention.

FIG. 3 is an illustration flow chart of the Detection of existing appliances module according to some embodiments of the preset invention.

FIG. 4 is an illustration flow chart of appliances (daily) activation Detection module according to some embodiments of the preset invention;

DETAILED DESCRIPTION

Figure 5:
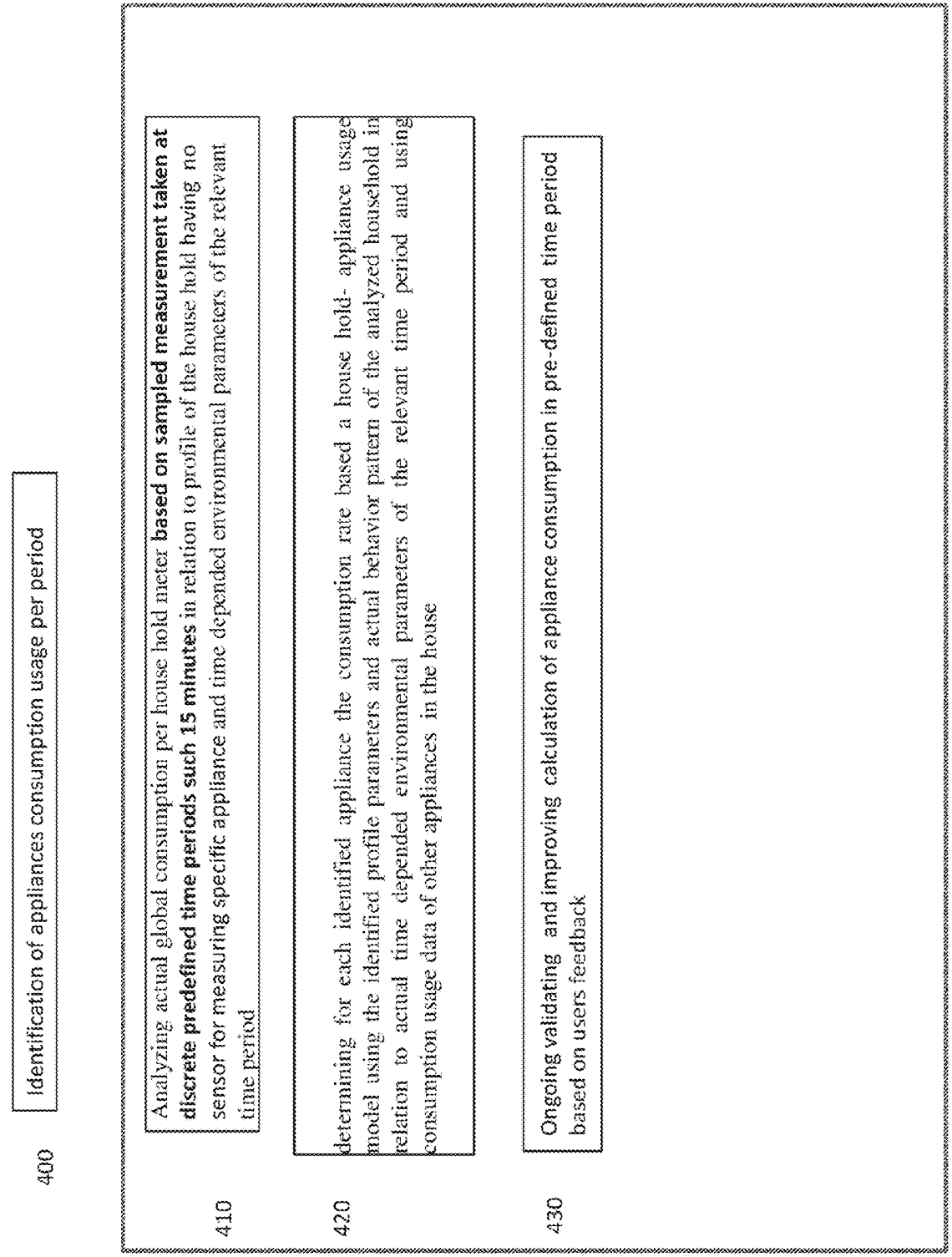
FIG. 5 is an illustration flow chart of the Identification of appliances consumption per period according to some embodiments of the preset invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| Appliance consumption model | Estimates an appliance's consumption by a correlation of the household profile and other consumption parameters (840), based on an identified correlation in a sample group |
| Appliance presence model | Estimates the presence of different types of appliances in a household, based on an identified correlation in a sample group. |
| Appliance activation model | Estimates activation of an appliance during a predefined time period such as a day, based on an identified correlation in a sample group. |
| Sampled households | Group of houses for which data is processed to create statistical models. |
| Surveyed household | A household having a known household profile and a local meter that can be surveyed at predefined discrete time periods and which provide global consumption of the house, but no measure regarding the presence of specific appliances and no sensors for measuring specific appliance usage. |
| Household profile | Household characteristics, such as: size, number of people, neighborhood, geographical location, type (Apartment, Flat, Villa), existence of prominent power consuming appliances (e.g. HVAC), age, building materials |
| Occupant lifestyle | Occupants' working hours, vacation schedules, habits, relevant behaviors regarding use of appliances (showering, heating, cooling, dishwasher use) |

The present invention provides presence and consumption models for household appliances, these models facilitating a determination of the presence of specific appliances, their rate of activation and their level of electrical consumption. The invention provides the model for surveyed houses in which appliances do not have remotely monitored sensors, and in which the meter can provide global consumption data for discrete time periods, such as 15 minute time periods. The models are based on the analysis historical data of small sample groups of households in which are installed sensors to measure each appliance.

FIG. 1 is a block diagram illustrating the modules for analyzing samples of appliances consumption history is sampled households and estimating presence, periodical activation and consumption of appliances in surveyed households according to some embodiments of the present invention. The present invention use historical samples of households where the consumption of each appliance, are measured by sensors associated with each appliances. The analyzing server 10 comprises: a history analyzing module 100 for processing history samples for identifying correlation between household profile, consumption behavior pattern and actual consumption of each appliance, Appliances Detection module 200 for identifying presence of appliances in surveyed household in which the type of appliances existing is unknown and there are no sensors for measuring the consumption of each appliance, appliances periodic e.g. daily activation Detection module 300 for identifying the activation of appliance of the served households at specific period such as a day time, appliances periodic portion (hourly) activation Detection module 350, and appliances consumption module 400 for estimating usage of each type appliance in relation to other appliances and the global consumption of the house.

Optionally, at the client house is installed Consumption report appliances module 500 on a computer device for providing the user with data of detected appliance in his house, periodic/daily activation of each appliance and consumption report enabling to view the contribution of each appliance to the global consumption. Optionally the module may alert of measurements which exceed pre-defined values in ration to household profile, personal history and environmental conditions. According to some embodiments of the present invention the module may enable the user to provide feedback to indicate the correctness of the reported data and data estimations.

FIG. 2 is an illustration flow chart of the History Analyzing Module (100) according to some embodiments of the preset invention. The analyzing module has three or four stages for generating three models: appliances presence model, periodic/daily activation model, optionally period potion activation model and consumption model. At the first stage is generated the first model to estimate the presence of different type appliances in the households based on household profile parameters using identified correlation to actual presence of appliances in a sample of houses in which the presence of the appliances was known. For example number of residence or profile of the household neighborhood can predict the presence of specific appliances, such is dishwasher. The presence may be further dependent on consumption pattern for appliances or consumption in relation to environmental time dependent parameters such heater appliances. See module logic in FIG. 6.

Figure 7:
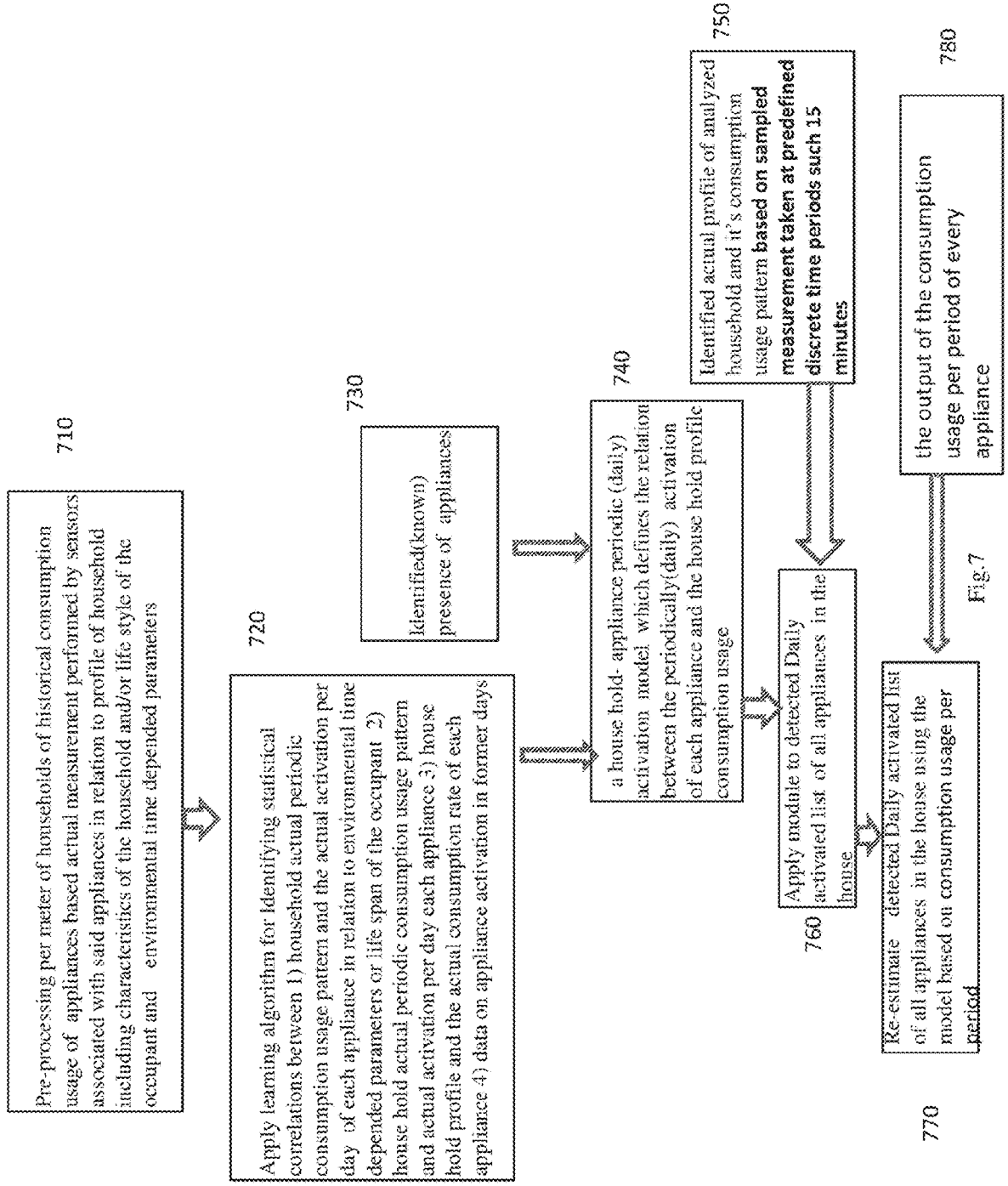
FIG. 7 is an illustration flow chart of a household appliance day activation model according to some embodiments of the preset invention.

The second model, as depicted in FIG. 7, uses the outcome of the first model of the list of detected appliance in the household for estimating if the appliances were activated at predefined time period such a day. The model analyzes identified correlations of surveyed household profile, consumption pattern and daily activation in former days. Optionally, this model uses the output of the consumption per period of every appliance of former days for re-estimating a detected daily activated list of all appliances in the household using the model based on consumption per period.

Figure 7A:
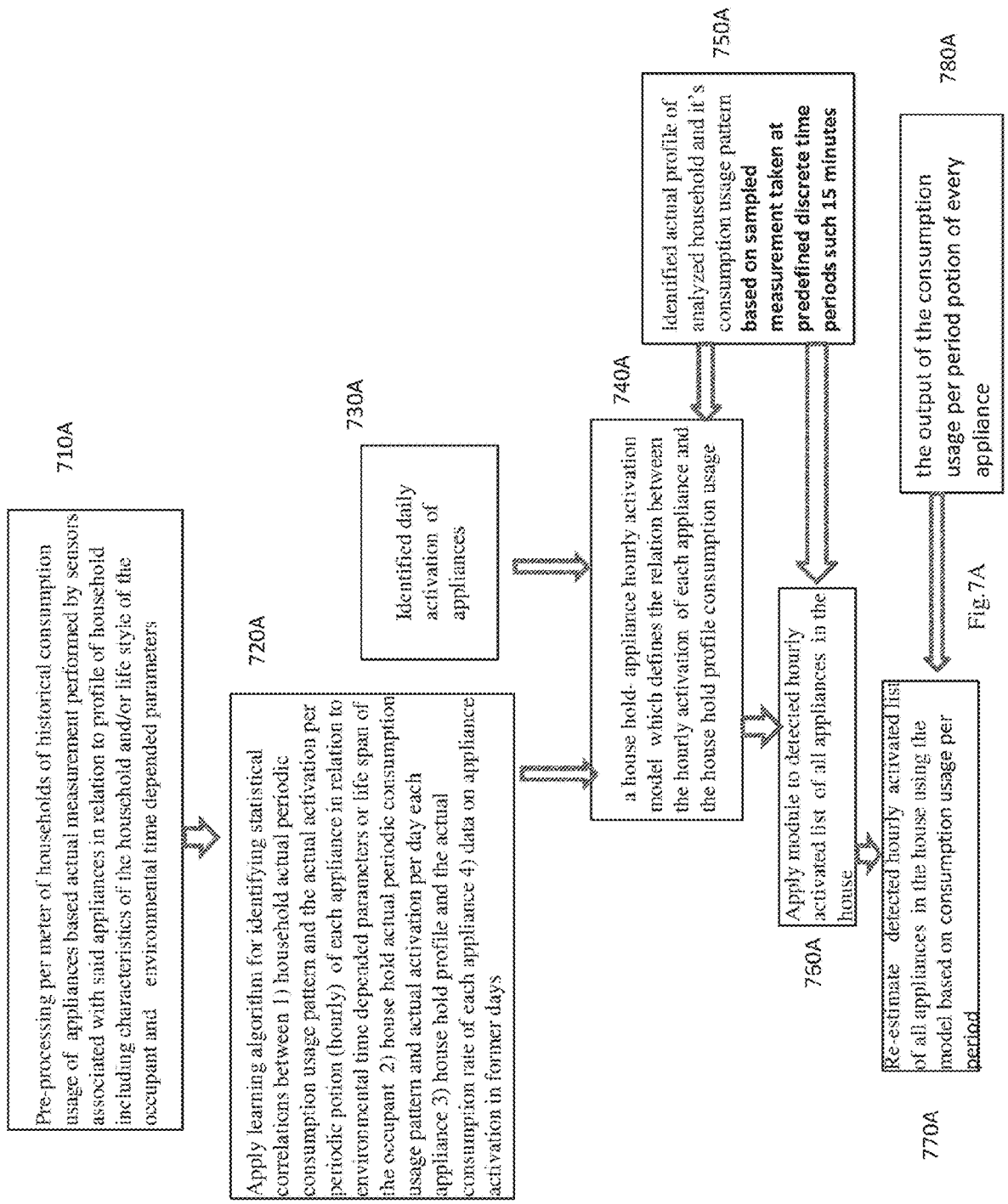

The third option model, as depicted in FIG. 7A, uses the outcome of the first model of the list of detected appliance in the household and the list of activated appliances at specific period such as a day for estimating if the appliances were activated at portion (hours) predefined time period such a day. The model analyzes identified correlations of surveyed household profile, consumption pattern and daily activation in former days or hours. Optionally, this model uses the output of the consumption per period of every appliance of former days for re-estimating the detected daily activated list of all appliances in the household using the model based on consumption per period.

Figure 8:
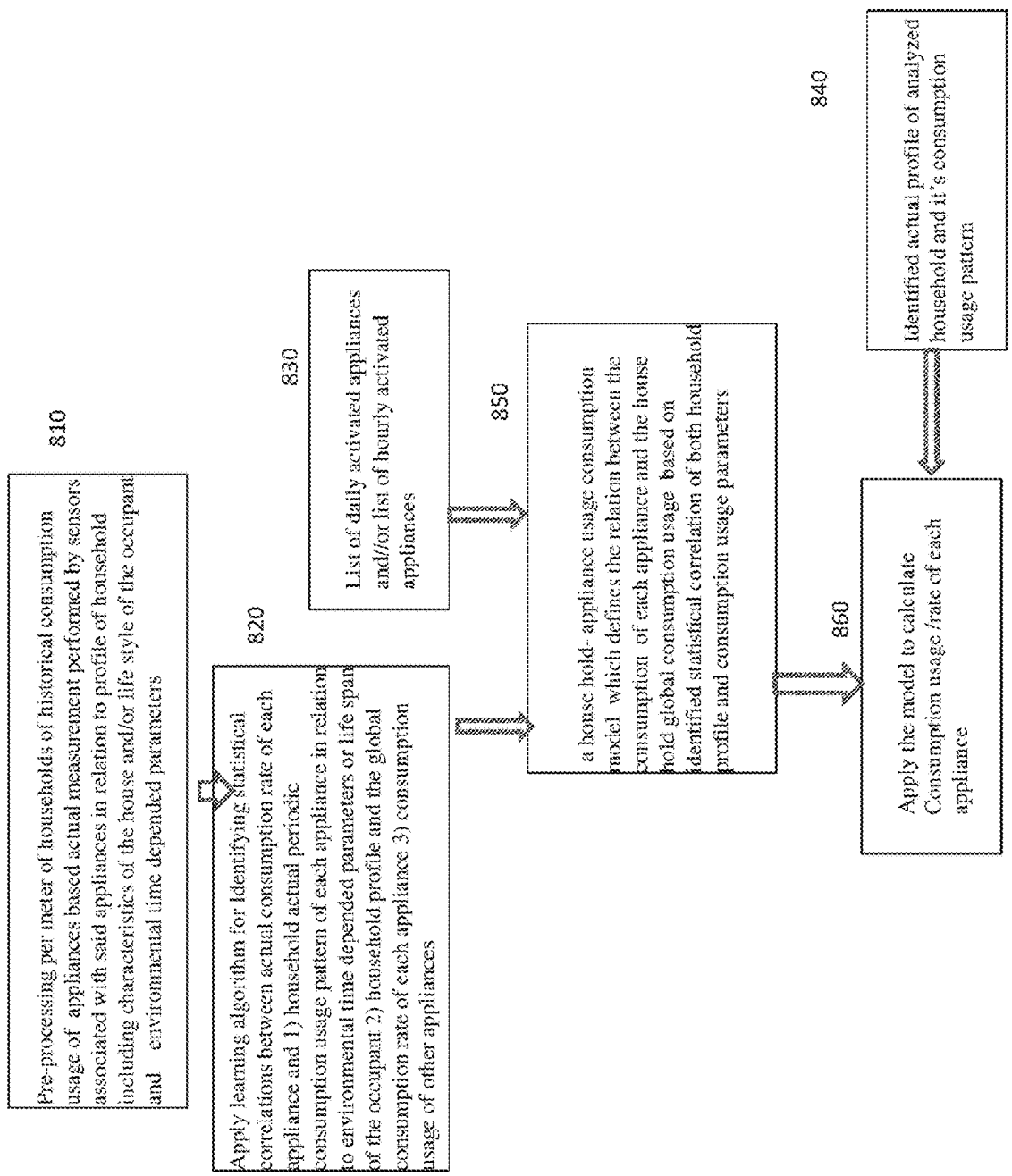
FIG. 8 is an illustration flow chart of a household appliance usage model according to some embodiments of the preset invention.

The fourth model as depicted in FIG. 8 uses the outcome of the second model of identified activated appliances in each day to estimate the usage consumption of each appliance. The model analyzes identified correlations of surveyed household profile, consumption pattern and consumption of other appliances.

The processing of the History Analyzing Module comprises the following steps:

pre-processing historical consumption of appliances of surveyed households based on actual measurements by sensors associated with said appliances in relation to profile of household including characteristics of the household and/or lifestyle of the occupant and environmental time dependent parameters (step 110);

applying learning algorithm for identifying statistical correlations between presence of appliances in a household and one or more of the following parameters: 1) household profiles parameters, 2) household actual periodic consumption pattern, and 3) household actual periodic consumption pattern in relation to environmental time dependent parameters (step 120). An option according to some embodiments of the present invention is that the learning algorithm is a gradient boosting learning machine algorithm;

building a household appliance presence model which defines the relation between the presences of each appliance and the household profile consumption based on identified statistical correlation of both household profile and global consumption parameters (step 130);

applying a learning algorithm for identifying statistical correlations between 1) household actual periodic consumption pattern and the actual activation per day of each appliance in relation to environmental time dependent parameters or lifestyle of the occupant 2) household actual periodic consumption pattern and actual activation per day each appliance 3) household profile and the actual consumption rate of each appliance 4) data on appliance activation in former days (step 140). Building a household appliance day activation model which defines the relation between the activation of appliance per day and the household profile consumption based on identified statistical correlation of both household profile global consumption parameters, usage of other appliances data on appliance activation in former days (step 150);

applying a learning algorithm for identifying statistical correlations between 1) household actual periodic portion (hourly) consumption pattern and the actual activation per periodic portion of each appliance in relation to environmental time dependent parameters or lifestyle of the occupant 2) household profile and the actual consumption rate of each appliance 3) data on appliance activation in former days (step 155);

building a household appliance periodic portion (hourly) activation model which defines the relation between the activation of an appliance per day and the household profile consumption based on an identified statistical correlation of both household profile global consumption parameters, usage of other appliances data on appliance activation in former days (step 157);

applying learning algorithm for identifying statistical correlations between actual consumption rate of each appliance and 1) household actual periodic consumption pattern of each appliance in relation to environmental time dependent parameters or lifestyle of the occupant 2) household profile and the global consumption rate of each appliance 3) consumption of other appliances (step 160); and/or building a household appliance usage model which defines the relation between the consumption of each appliance and the household global consumption based on identified statistical correlation of both household profile and consumption parameters (step 170).

FIG. 3 is an illustration flow chart of the Detection of existing appliances in module 200 in surveyed houses in which there are no sensors for measuring consumption of each appliance according to some embodiments of the preset invention. The process comprises the following steps: Analyzing actual global consumption per household meter based on sampled measurement taken at predefined discrete time periods such 15 minutes in relation to profile of the household and time dependent environmental parameters of the relevant time period and in relation to lifestyle of the occupant (step 210); determining the probability of each appliance presence at the analyzed household based on a household appliance presence model using the identified profile parameters, actual behavior pattern of the analyzed household (step 220) and/or Ongoing validating and improving calculation of appliance presence in pre-defined time period based on users feedback (step 230).

FIG. 4A is an illustration flow chart of appliances periodic (daily) activation Detection module 300 of households in which there are no sensors for measuring consumption of each appliance according to some embodiments of the preset invention. The process comprises the following steps: Analyzing actual global consumption per household meter based on sampled measurement taken at predefined time discrete periods, such as 15 minutes, in relation to profile of the household and time dependent environmental parameters of the relevant time period and in relation to lifestyle of the occupant (step 310) and determining for each identified appliance if an appliance was activated during the current day at the analyzed household based on a household appliance daily activation model using the identified profile parameters, actual behavior pattern of the analyzed household in relation to actual time dependent environmental parameters of the relevant time period and activation of the appliance during last days or period (step 320).

FIG. 4A is an illustration flow chart of appliances periodic portion (hourly) activation Detection module 300 of surveyed households in which there are no sensors for measuring consumption of each appliance according to some embodiments of the preset invention. The process comprises the following steps:

applying a learning algorithm for analyzing actual global consumption per household meter based on sampled measurement taken at discrete predefined time periods such as 15 minutes in relation to profile of the household having no sensor for measuring specific appliance and time dependent environmental parameters of the relevant time period and in relation to lifestyle of the occupant (step 330); and determining for each identified appliance if an appliance was activated during the specific hour of the day at the analyzed household based on a household appliance daily activation model using the identified profile parameters, actual behavior pattern of the analyzed household in relation to actual time dependent environmental parameters of the relevant time period and activation of the appliance during last days or hours (step 440).

FIG. 5 is an illustration flow chart of the Identification of appliances consumption 400 of surveyed households in which there are no sensors for measuring consumption of each appliance according to some embodiments of the preset invention. The process comprises the following steps: analyzing actual global consumption per household meter based on sampled measurement taken at predefined time periods such as, 15 minutes in relation to profile of the household and time dependent environmental parameters of the relevant time period (step 410); determining for each identified appliance the consumption rate based a household appliance usage model using the identified profile parameters and actual behavior pattern of the analyzed household in relation to actual time dependent environmental parameters of the relevant time period and using consumption data of other appliances in the household (step 420) and ongoing validating and improving calculation of appliance consumption in pre-defined time period based on users feedback (step 430). The user feedback includes indication to the correctness of identified appliances and their activation.

Figure 6:
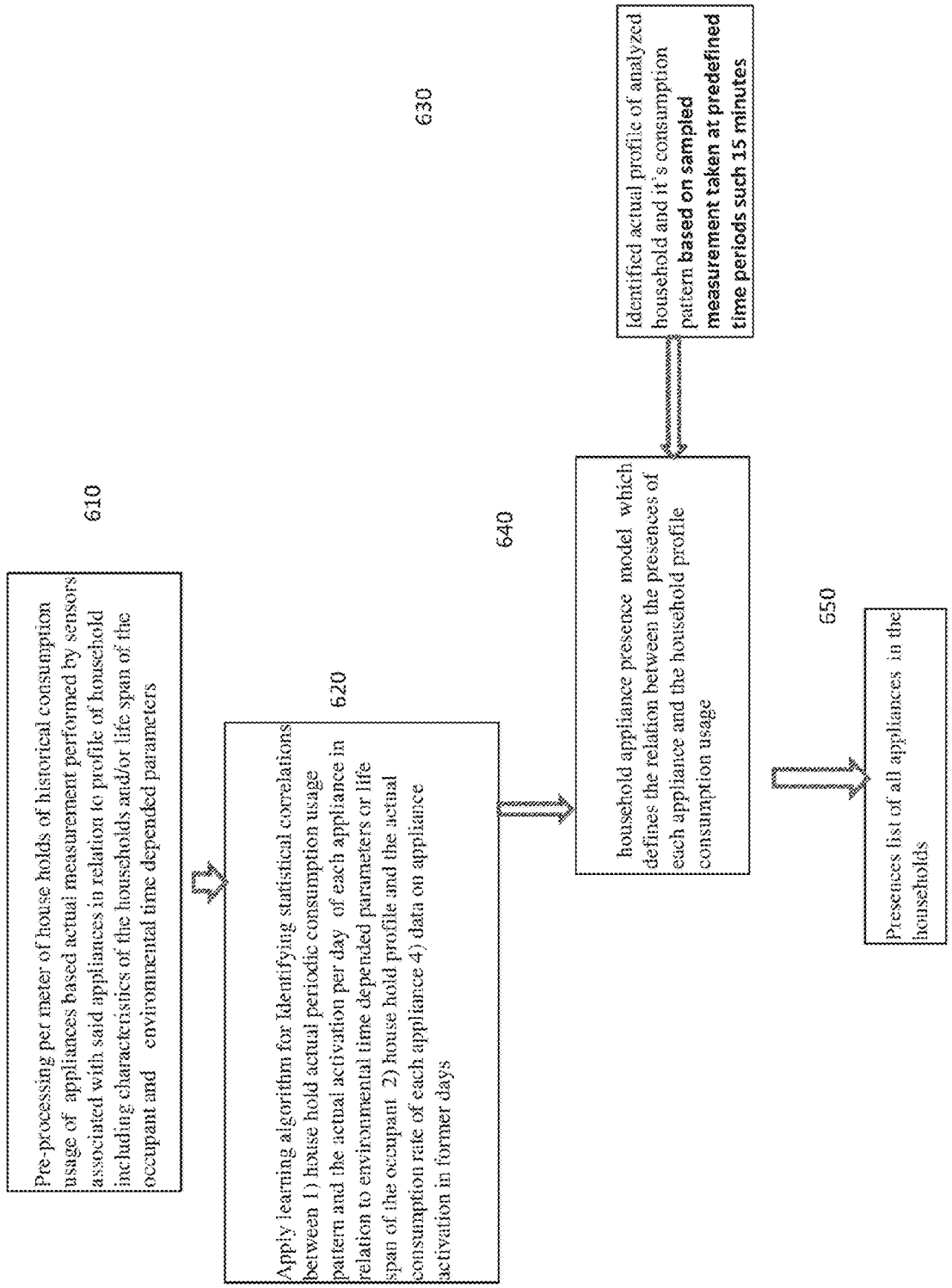
FIG. 6 is an illustration flow chart of the household appliance presence model according to some embodiments of the preset invention.

FIG. 6 is an illustration flow chart of the household appliance presence model according to some embodiments of the preset invention.

The presence model applies the following steps:

Pre-processing per meter of households of historical consumption of appliances based actual measurement performed by sensors associated with said appliances in relation to profile of household including characteristics of the households and/or lifestyle of the occupant and environmental time dependent parameters (610)

Identifying statistical correlations between 1) household actual periodic consumption pattern and the actual activation per day of each appliance in relation to environmental time dependent parameters or lifestyle of the occupant 2) household actual periodic consumption pattern and actual activation per day each appliance 3) household profile and the actual consumption rate of each appliance 4) data on appliance activation in former days Based on the pre-processing and the identified correlation building: household appliance presence model which defines the relation between the presences of each appliance and the household profile consumption. (640)

Running the model using the identified actual profile of analyzed household and its consumption pattern based on sampled measurement taken at predefined time periods such as 15 minutes (640) for resulting Presences list of all appliances in the households (650).

FIG. 7 is an illustration flow chart of a household appliance day activation model according to some embodiments of the preset invention.

The model of identification of appliances activation apply the following steps:

pre-processing historical consumption of appliances in sample households based on actual measurements by sensors associated with said appliances in relation to a profile of household including characteristics of the household and/or lifestyles of the occupants and environmental time dependent parameters (710);

Identifying statistical correlations between 1) household actual periodic consumption patterns and the actual activation per day of each appliance in relation to environmental time dependent parameters or lifestyle of the occupant 2) household actual periodic consumption patterns and actual activation per day each appliance 3) household profile and the actual consumption rate of each appliance 4) data on appliance activation in former days (720);

building a household appliance daily activation model for the list of identified (known) presence of appliances (730), which defines the relation between the presences of each appliance and the household profile consumption based on identified actual profile of analyzed household and its consumption pattern based on sampled measurement taken at predefined discrete time periods such 15 minutes (740);

applying a model (760) to detect a daily activated list of all appliances in the household based on an identified actual profile of analyzed household and its consumption pattern based on sampled measurement taken at predefined discrete time periods such as 15 minutes (750);

re-estimating a detected daily activated list of all appliances in the house (770) using the model based on consumption per period based the output of the consumption per period of every appliance (780)

FIG. 7A is an illustration flow chart of a household appliance day activation model according to some embodiments of the preset invention.

The model of identification of appliances periodic potion activation apply the following steps:

Pre-processing per meter of households of historical consumption of appliances based actual measurement performed by sensors associated with said appliances in relation to profile of household including characteristics of the household and/or lifestyle of the occupant and environmental time dependent parameters (710 *a*);

Apply learning algorithm for identifying statistical correlations between 1) household actual periodic consumption patterns and the actual activation per periodic potion (hourly) of each appliance in relation to environmental time dependent parameters or lifestyle of the occupant 2) household actual periodic consumption patterns and actual activation per day each appliance 3) household profile and the actual consumption rate of each appliance 4) data on appliance activation in former days (step 720*a*);

Building a household appliance hourly activation model which defines the relation between the hourly activation of each appliance and the household profile consumption (step 740A)

Apply module to detected hourly activated list of all appliances in the house (760A) based on Identified actual profile of analyzed household and its consumption patterns based on sampled measurement taken at predefined discrete time periods such 15 minutes (750A);

Re-estimate detected hourly activated list of all appliances in the house using the model based on consumption per period, (770 A), based on consumption per period based the output of the consumption per period potion of every appliance (780A)

FIG. 8 is an illustration flow chart of a household appliance consumption usage model according to some embodiments of the preset invention. The model of the appliance usage calculation include at least some of the following steps:

pre-processing per meter of households of historical consumption of appliances based actual measurement performed by sensors associated with said appliances in relation to profile of household including characteristics of the house and/or lifestyle of the occupant and environmental time dependent parameters (810);

identifying statistical correlations between actual consumption rate of each appliance and 1) household actual periodic consumption patterns of each appliance in relation to environmental time dependent parameters or lifestyle of the occupant 2) household profile and the global consumption rate of each appliance 3) consumption of other appliances; (820)

building a household appliance usage consumption model for the list of daily activated appliances (830) which defines the relation between the consumption of each appliance and the household global consumption based on identified statistical correlation of both household profile and consumption parameters (840);

applying the model to the identified actual profile of analyzed household and its consumption patterns (840) to calculate a consumption rate of each appliance.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for determining probable presence, in a surveyed household, of appliances having no load sensors, said method implemented by one or more processing devices operatively coupled to a non-transitory storage device, on which are stored modules of instruction code that when executed cause the one or more processing devices to perform:

acquiring, for each sampled household of a group of sampled households, data on historical consumption of appliances in the respective sampled household, said data acquired by load sensors associated with said appliances;

applying a learning algorithm to identify first statistical correlations between the data from each respective sampled household and parameters of each respective sampled households including at least one of: 1) household profile, 2) household periodic consumption patterns, 3) household periodic consumption in relation to environmental time-dependent parameters, and 4) lifestyles of the household occupants;

determining from the first statistical correlations a statistical appliance presence model;

determining, from parameters of the surveyed household and the statistical appliance presence model, a probability of an appliance's presence in the surveyed household, wherein the surveyed household is not part of the sampled households;

wherein the data in the sampled households include actual activation and consumption across the day of each appliance, overall data of the household, household profile and characteristics, historical consumption reads for the appliances and household overall, weather condition across the day; and further comprising:

determining, from the first statistical correlations and identified presence of appliances generated by the statistical appliance presence model, a machine learning appliance activation model; and determining, from parameters of the surveyed household and the machine learning appliance activation model, a probability of an appliance's activation in the surveyed household;

re-estimating a detected daily activated list of all appliances in the household using the machine learning appliance activation model based on consumption usage per period;

applying the machine learning algorithm for identifying second statistical correlations between household actual periodic portion, hourly or sub-hourly consumption usage pattern and actual activation per periodic portion of each appliance in relation to at least one of 1) environmental time dependent parameters or life style of the occupant, 2) household profile and actual consumption rate of the household overall, and 3) data on historical usage in former days or hours of the household overall;

building a household appliance hourly and/or sub-hourly activation model based on identified machine learning second statistical correlations, which defines the statistical correlations between the hourly or sub-hourly activation of each appliance and the household profile consumption usage, and detected daily activation of appliances generated by the machine learning appliance activation model; and applying the household appliance hourly and/or sub-hourly machine learning activation model for determining for each identified appliance at what hours the detected appliance was activated during detected activated period at the surveyed household by processing identified machine learning second statistical correlations between appliance activation and at least one of profile parameters, actual behavior pattern of the analyzed household in relation to actual time dependent environmental parameters of the relevant time period, and consumption pattern and daily activation in former days or hours;

wherein the statistical appliance presence model, the machine learning appliance activation model, and the household appliance hourly and/or sub-hourly machine learning activation model are configured, trained, and applied to different time periods, different tested features, and different analyzed parameters.

2. The method of claim 1, further comprising the steps:

building a household appliance usage consumption model which defines the relation between the consumption of each appliance and the household global consumption usage based on identified third statistical correlation of both household profile and consumption usage parameters; and applying household appliance usage consumption model for estimating consumption usage of each activated appliance in the surveyed household based on identified correlations to between household profile and consumption usage pattern of the household.

3. The method of claim 1, wherein for both the surveyed household and the sampled households consumption is sampled at the same frequency.

4. A method for determining presence of an appliance within a surveyed household in which there are no sensors for measuring consumption of specific appliance, said method implemented by one or more processing devices operatively coupled to a non-transitory storage device, on which are stored modules of instruction code that when executed cause the one or more processing devices to perform:

pre-processing of historical consumption of appliances in sampled households based on actual measurements by sensors associated with said appliances in relation to characteristics of the households including one or more of lifestyle of the occupants and environmental time-dependent parameters;

applying a learning algorithm for identifying first statistical correlations between presence of appliances in each sampled household and at least one of 1) household profile parameters, 2) household actual periodic consumption patterns, and 3) household actual periodic consumption usage pattern in relation to environmental time-dependent parameters;

building household appliance presence model which defines the relation between the presences of each appliance and the household profile consumption usage based on identifying first statistical correlations; and determining the probability of each appliance presence at the surveyed household using identified profile parameters and the calculated consumption of the actual behavior pattern of the surveyed household, based on processing identified first statistical correlations between presence of appliances at each household and at least one of: 1) household profiles parameters, 2) household actual periodic consumption usage pattern, 3) household actual periodic consumption usage pattern in relation to environmental time-dependent parameters, wherein the surveyed household is not part of the sampled households;

wherein the data in the sampled households include actual activation and consumption across the day of each appliance, overall data of the household, household profile and characteristics, historical consumption reads for the appliances and household overall, weather condition across the day; and further comprising:

determining, from the first statistical correlations and identified presence of appliances generated by the statistical appliance presence model, a machine learning appliance activation model; and determining, from parameters of the surveyed household and the machine learning appliance activation model, a probability of an appliance's activation in the surveyed household;

re-estimating a detected daily activated list of all appliances in the household using the machine learning appliance activation model based on consumption usage per period;

applying the machine learning algorithm for identifying second statistical correlations between household actual periodic portion, hourly or sub-hourly consumption usage pattern and actual activation per periodic portion of each appliance in relation to at least one of 1) environmental time dependent parameters or life style of the occupant, 2) household profile and actual consumption rate of the household overall, and 3) data on historical usage in former days or hours of the household overall;

building a household appliance hourly and/or sub-hourly activation model based on identified machine learning second statistical correlations, which defines the statistical correlations between the hourly or sub-hourly activation of each appliance and the household profile consumption usage, and detected daily activation of appliances generated by the machine learning appliance activation model; and applying the household appliance hourly and/or sub-hourly machine learning activation model for determining for each identified appliance at what hours the detected appliance was activated during detected activated period at the surveyed household by processing identified machine learning second statistical correlations between appliance activation and at least one of profile parameters, actual behavior pattern of the analyzed household in relation to actual time dependent environmental parameters of the relevant time period, and consumption pattern and daily activation in former days or hours; and wherein the household appliance presence model, the machine learning appliance activation model, and the household appliance hourly and/or sub-hourly machine learning activation model are configured, trained, and applied to different time periods, different tested features, and different analyzed parameters.

5. The method of claim 4, further comprising: identifying fourth statistical correlations between at least one of: 1) household actual periodic consumption usage pattern and the actual activation per day of each appliance in relation to environmental time-dependent parameters or life style of the occupant, 2) household actual periodic consumption usage pattern and actual activation per day each appliance, 3) household profile and the actual consumption rate of each appliance, 4) data on appliance activation in former days.

6. The method of claim 4, further comprising the step of identifying fifth statistical correlations between actual consumption rate of each appliance and at least one of: 1) household actual periodic consumption usage pattern of each appliance in relation to environmental time-dependent parameters or lifestyle of the occupant, and 2) household profile and the global consumption rate of each appliance.

7. The method of claim 4, further comprising the step of identifying sixth statistical correlations between the household profile, the global consumption rate of each appliance and the consumption usage of other appliances.

8. The method of claim 4, further comprising the steps:
building a household appliance usage consumption model which defines the relation between the consumption of each appliance and the household global consumption based on identified third statistical correlation of both household profile and consumption parameters; and
applying household appliance usage consumption model for estimating consumption of each activated appliance in the surveyed household based on identified correlations to between household profile and consumption pattern of the household.

9. The method of claim 4, wherein for both the surveyed household and the sampled households consumption is sampled at the same frequency.

10. A computer based system for determining presence appliance within a household in which there are no sensors for measuring consumption of specific appliance, said system comprising a non-transitory storage device and one or more processing devices operatively coupled to the storage device on which are stored modules of instruction code executable by the one or more processors:
a history analysis module configured to pre-processing per meter of sample households of historical consumption of appliances based actual measurement performed by sensors associated with said appliances in relation to profile of household including characteristics of the household and/or lifestyle of the occupant and environmental time dependent parameters;
an appliance detection module for
applying learning algorithm for identifying first statistical correlations between presence of appliances at each household and at least one of 1) household profiles parameters, 2) household actual periodic consumption pattern, and 3) household actual periodic consumption pattern in relation to environmental time dependent parameters;
building household appliance presence model which defines the relation between the presences of each appliance and the household profile consumption based on identifying first statistical correlations; and
determining the probability of each appliance presence at the surveyed household using identified profile parameters and the calculated consumption of the actual behavior pattern of the surveyed household, based on processing identified first statistical correlations between presence of appliances at each household and household profiles parameters, household actual periodic consumption pattern in relation to environmental time dependent parameters, wherein the surveyed household is not part of the sampled households;
wherein the data in the sampled households include actual activation and consumption across the day of each appliance, overall data of the household, household profile and characteristics, historical consumption reads for the appliances and household overall, weather condition across the day; and further comprising:
determining, from the first statistical correlations and identified presence of appliances generated by the statistical appliance presence model, a machine learning appliance activation model; and
determining, from parameters of the surveyed household and the machine learning appliance activation model, a probability of an appliance's activation in the surveyed household;
re-estimating a detected daily activated list of all appliances in the household using the machine learning appliance activation model based on consumption usage per period;
applying the machine learning algorithm for identifying second statistical correlations between household actual periodic portion, hourly or sub-hourly consumption usage pattern and actual activation per periodic portion of each appliance in relation to at least one of 1) environmental time dependent parameters or life style of the occupant, 2) household profile and actual consumption rate of the household overall, and 3) data on historical usage in former days or hours of the household overall;
building a household appliance hourly and/or sub-hourly activation model based on identified machine learning second statistical correlations, which defines the statistical correlations between the hourly or sub-hourly activation of each appliance and the household profile consumption usage, and detected daily activation of appliances generated by the machine learning appliance activation model; and
applying the household appliance hourly and/or sub-hourly machine learning activation model for determining for each identified appliance at what hours the detected appliance was activated during detected activated period at the surveyed household by processing identified machine learning second statistical correlations between appliance activation and at least one of profile parameters, actual behavior pattern of the analyzed household in relation to actual time dependent environmental parameters of the relevant time period, and consumption pattern and daily activation in former days or hours;
wherein the household appliance presence model, the machine learning appliance activation model, and the household appliance hourly and/or sub-hourly machine learning activation model are configured, trained, and applied to different time periods, different tested features, and different analyzed parameters.

11. The system of claim 10, wherein for both the surveyed household and the sampled households consumption is sampled at the same frequency.

* * * * *